Nov. 21, 1967   E. G. LOEWEN ET AL   3,354,319
OPTICAL ILLUMINATION AND SENSING SYSTEM INCLUDING
A PLURALITY OF OPTICAL FIBER MEANS
Filed June 14, 1967   3 Sheets-Sheet 1

ERWIN G. LOEWEN
ROBERT J. MELTZER
INVENTORS

BY Charles C. Krauzzyk

ATTORNEY

United States Patent Office 3,354,319
Patented Nov. 21, 1967

3,354,319
OPTICAL ILLUMINATION AND SENSING SYSTEM INCLUDING A PLURALITY OF OPTICAL FIBER MEANS
Erwin G. Loewen, East Rochester, and Robert J. Meltzer, Irondequoit, N.Y., assignors to Bausch & Lomb Incorporated, Rochester, N.Y., a corporation of New York
Filed June 14, 1967, Ser. No. 645,933
9 Claims. (Cl. 250—227)

ABSTRACT OF THE DISCLOSURE

The application includes an optical system including furcate bundles of optical fibers for directing radiation from a single source through a plurality of light valves to a single photosensor in a predetermined sequence. In a first embodiment the light valves include a scale with alternate reflective or transparent portions and a plurality of spaced reticles mounted in optical series with the scale. In a second embodiment the light valves comprise separate portions of a pair of optical gratings.

Cross-references to related applications

This application is a continuation-in-part of an original application Ser. No. 275,539, filed Apr. 25, 1963, now abandoned.

Systems such as the optical electric system disclosed and claimed in the copending application of K. Kreckel, E. Loewen and R. J. Meltzer, entitled, "Optical Electric System," Ser. No. 275,540, filed Apr. 25, 1963, and assigned to the same assignee as the present invention have created a demand for exceptionally accurate scale systems. Such systems are designed for determining angular milliseconds and because of their high degree of accuracy require precision alignment and stable conditions. Alignment of such scales may be obtained by means of the centering system disclosed and claimed in the copending continuation-in-part application of Robert J. Meltzer, Ser. No. 625,470, filed Mar. 23, 1967, which is assigned to the same assignee as the present invention.

Background of the invention

This invention relates to a fiber optical system for illuminating and sensing the operation of a plurality of controlled light paths.

In apparatus for accurately measuring the location and/or movement of controlled devices, optical systems such as gratings, or scale and reticle combinations are employed to provide a radiation pattern directly related to position or movement of the controlled device. In order to obtain information as to the extent and direction of movement, the radiation pattern must be detected in at least two separate positions. This is generally accomplished in the prior art by employing two light sources and two photodetectors positioned on opposite sides of the gratings, scales, etc. If the light sources are positioned near the gratings or scales, the gratings or scales tend to change their radiation pattern due to thermal expansion thereby introducing errors. Furthermore, any fluctuations in the intensity of individual light sources or the characteristic of the individual photodetectors are also sources of error.

Advantageously, the novel system according to the present invention tends to minimize problems associated with a temperature gradient in the vicinity of a scale. Furthermore, any problems associated with fluctuations in light intensities or detector sensitivity have been minimized and from a practical standpoint have been eliminated. An additional advantage obtained by incorporating a novel system according to this system in an optical device is that it eliminates the need for slip rings or other contact means.

Summary of the invention

The optical system of the invention includes optical means for directing radiation from a source to a plurality of light valves such as a scale and a plurality of separated reticles, or portions of two superimposed gratings or scales. If the area of illumination is small, such as in the case of parallel optical gratings, the optical means may comprise a lens for directing a collimated beam of radiation thereto. If on the other hand, if the areas of illumination are separated, such as the case of a scale with a plurality of separated reticles in optical series with the scale, the optical means comprises a furcate bundle of optical fibers having the common end receiving radiation from the source and a plurality branches applying radiation to the plurality of light valves or separate portions of the gratings. A second furcate bundle of optical fiber bundles is positioned in optical series with the plurality of branches, receiving radiation from separate ones of the plurality of light valves, or the separate portions of the gratings and directing the radiation received through the common end toward a single photodetector.

A further feature of the invention includes chopper means positioned to interrupt the radiation passing through the branches of one of the furcate bundles in a predetermined sequence.

Description of the preferred embodiments

Figure 1:
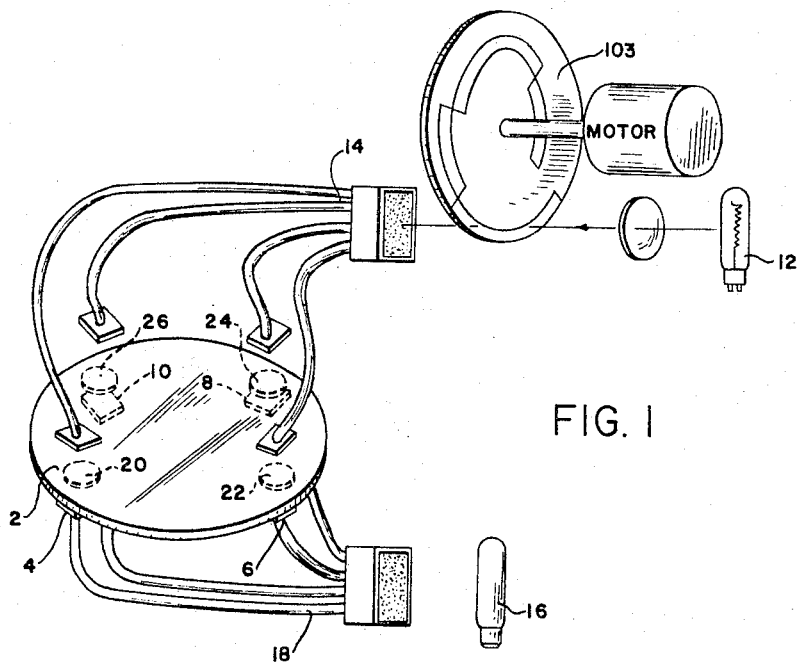
FIG. 1 is a schematic illustration of an embodiment of the present invention which shows a circular transparent scale, reticle, and photodetector arrangement.

A scale 2 and reticles 4, 6, 8 and 10 are preferably illuminated by means of a single light source 12 and a furcate bundle 14 of optical fibers. Light from the light source is directed to the reticle scale combinations by means of the fiber bundle 14. The portion of light passing through the scale-reticle combination is conducted to a single photomultiplier 16 by means of a second furcate bundle 18 of optical fibers. There are numerous advantages obtained by using fiber bundles in the present system. For example, a single light source can be used with a plurality of fibers to thereby eliminate the need for a plurality of different light sources. Similarly the fiber bundles make it possible to use a single photodetector for all reticles. Using a single detector and a single light source overcome to a high degree any problems associated with varying light intensity or varying detector sensitivity. The fiber bundles also eliminate the need for slip rings or other contact means which would be in contact with rotating table. The slip rings or contact means would be required to eliminate problems associated with stray light.

Locating the light source at a distance from the scale and conducting light to a scale by means of optical fiber tends to minimize errors which would result from a temperature change in the vicinity of the scale. Preferably the end of the bundle should appear in the same plane as the lines of the reticle. This arrangement may be accomplished by means of an appropriate optical system, i.e. one which images the end of the fiber bundle onto the lens which in turn images the scale onto the reticles.

The scale mounting, centering arrangement and means for protecting the system may be varied for particular applications. In the presently preferred embodiments it has been found desirable to include a circular scale which is ruled for 360°. Generally, it is thought to be impractical to produce a full circular scale with a line at each one hundredth arc second. The use of scale ruling facilities such as those used in the manufacture of optical gratings may overcome this difficulty to a degree, for example, any periodic errors resulting in the ruling engine may be compensated to a certain degree by conventional techniques. If the number of lines are maximized, however, the spacing will be too small to be resolved by presently available optics. Therefore, a compromise should be made, between a relatively wide spacing which would place a relatively high burden on the interpolation scheme, and a scale so fine that diffraction effects interfere with the determination of position.

Figure 2:
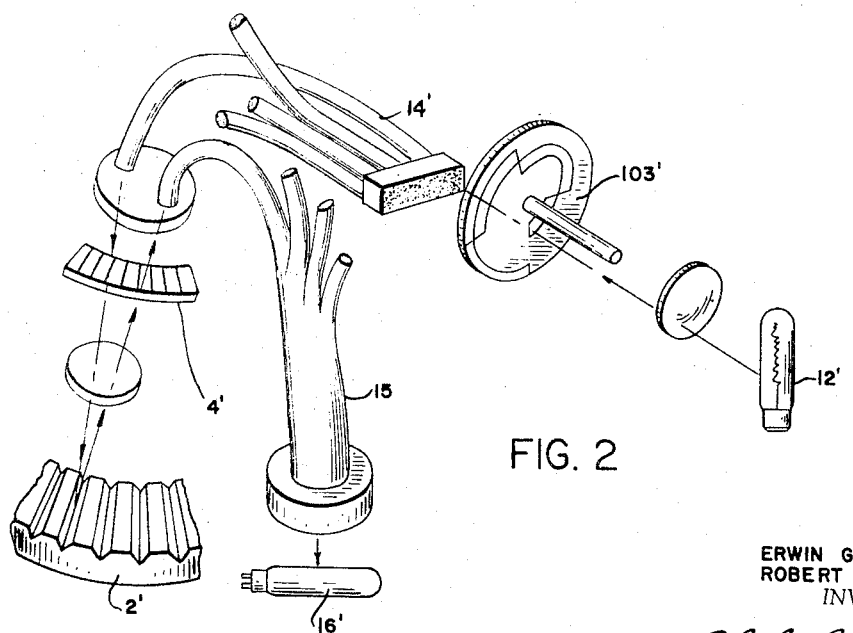
FIG. 2 is a fragmentary schematic view which illustrates a modification of FIG. 1 by employing a reflective scale.

In some cases it is desirable to cyclically sample the scale reticle combinations. Such cyclical sampling is accomplished by means of a motor driven chopper disc 103 or 103'. As schematically illustrated in FIGURES 1 and 2 the ends of the branches of the furcate fiber bundles 14 and 14' are juxtaposed in a mounting frame in a straight row. The discs 103 and 103' are formed with a plurality of arcuate radiation transparent slots, the number of which equals the number of branches in the furcate bundle. In the particular embodiment of FIGURES 1 and 2, the discs include four slots, one for each of the four branches. The slots in the discs are radially spaced from the point of rotation corresponding to the spacing between the branches in the mounting frame. As the discs are rotated, the slots provide passage for radiation from individual branches to the photomultiplier tube 12 or 12' in a sequence determined by the arrangement of the slots. More details of a system of this type are set forth in the aforementioned copending application of Kreckel, Loewen and Meltzer.

The imaging system such as the lenses 20, 22, 24 and 26 images portions of the scale onto the reticles. The quality of the optics in the imaging system are such that the images have the desired contrast and low distortion. As the spacing of the scale lines becomes smaller and as the number of images imaged becomes large, it becomes more difficult to obtain satisfactory contrast and distortion characteristics. It is desirable to image a relatively large number of scale lines in order to take advantage of an averaging effect. The averaging effect tends to overcome small accidental errors which would cause a corresponding loss in the accuracy of the entire system.

An image of the scale is formed by the lines in the plane of the reticles to thereby form a light valve. Even though the same effect might be obtained by placing the scale and reticle in close proximity, such as the familiar moire systems, the use of an imaging system facilitates protecting the scale and reticle from the resulting risk of damage. An attempt to overcome the problem by using collimated light would require the use of a relatively high quality lens to reduce the angular subtense of the source. This approach would substantially reduce the amount of light and further complicate the system.

The reticles and associated lenses are aligned in order to facilitate making adjustments and sensing the effects of such adjustments. The adjustments include a focusing adjustment, two translations perpendicular to the plane in which the focal point lies and rotation about the optical axes. Generally these adjustments are made according to the method disclosed and claimed in the aforementioned copending application of Robert J. Meltzer, Serial No. 625,470. Briefly, the method disclosed and claimed therein comprises the steps of making a relatively crude adjustment with a microscope or a plurality of microscopes which have been substituted for the receiving fiber bundle. The second step or the ultimate adjustment incorporates appropriate electrical signals. The scale is rotated and the amplitude of the AC signal resulting will be peaked or maximized.

One embodiment of the invention is shown more clearly by the fragmentary perspective view in FIG. 2. The system is generally similar to the system shown in FIG. 1, however, includes a reflective scale 2' rather than a scale which transmits light. The scale 2' is illuminated by the light source 12' through the chopper disc 103' and furcate bundle 14'. Differences in reflected light are transmitted by means of a portion 15 of bundle 14' to a detector 16'.

The scale 2' comprises a plurality of radial lines. The lines are alternately flat and concave to thereby provide differences in light reflecting characteristics. These differences are averaged by using a furcate bundle such as the bundle 15 to thereby provide an optical mix which is incident upon the photodetector 16'.

Figure 3:
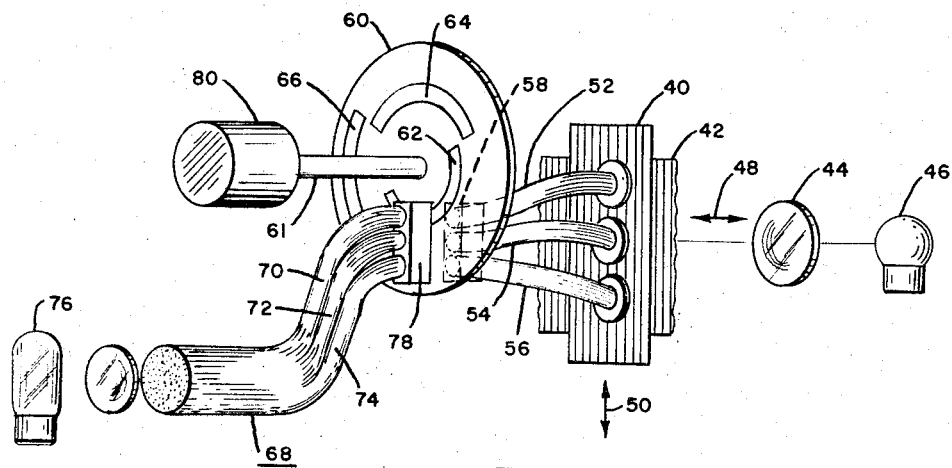
FIG. 3 is a schematic illustration of an embodiment of the invention with a pair of optical gratings for generating a fringe pattern.
Figure 5:
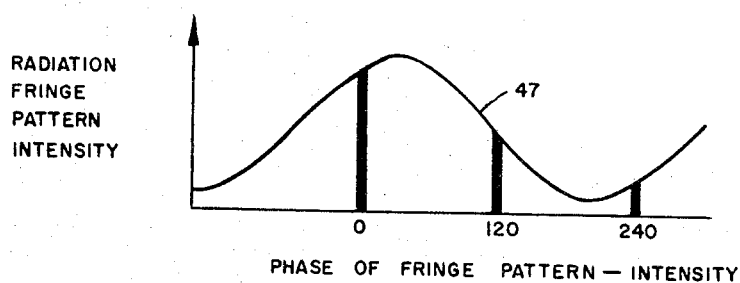
FIG. 5 is a graphic illustration of a cycle of fringe pattern and positioning of the fiber bundles of FIGS. 3 and 4.

In the embodiment of FIGURE 3 a stationary scale or grating 40 is mounted adjacent to and its rulings at a slight angle with respect to the rulings of a movable scale or grating 42. A collimating lens 44 directs radiation from a source 46 towards the gratings so that a cyclic moire radiation fringe pattern is developed. The cycles of the moire fringe pattern have a generally sinusoidal radiation intensity distribution, a cycle of which is illustrated by the curve 47 of FIGURE 5. As the grating 42 is moved in a direction at right angles with respect to its line structure (as designated by the arrows 48) the fringe pattern moves at right angles to the direction of the movement (as designated by the arrows 50). Accordingly, as the movable grating moves, the fringe patterns move a corresponding amount.

Three optical fiber bundles 52, 54 and 56 are positioned along the path of movement of the fringe pattern so that each of the fiber bundles receive radiation from different portions of the cyclic fringe pattern. In the embodiment of FIGURE 3 the three bundles 52, 54 and 56 are mounted to receive radiation from a single cycle of fringe pattern at a separation of 120° (as illustrated by the dark bars in FIGURE 5) or three different cycles of fringe pattern but phase shifted in the order of 120°.

The other end of the fiber bundles 52, 54 and 56 are juxtaposed to form a straight row by a mounting frame 58 with their ends in a plane parallel to a thin chopper disc 60 mounted for rotation on a shaft 61. The disc 60 includes three arcuate radiation transparent slots 62, 64 and 66 radially spaced from the shaft 61 so that the slots are sequentially aligned with the branches 52, 54 and 56 respectively as the disc is rotated. A furcate bundle of optical fibers 68 including three branches 70, 72 and 74 is mounted with a common end facing a photosensor 76 and its branches juxtaposed in a straight row by a mounting frame 78 on the opposite side of the disc 60 with the branches 70, 72 and 74 in optical series with the bundles 52, 54 and 56 respectively.

Figure 6:
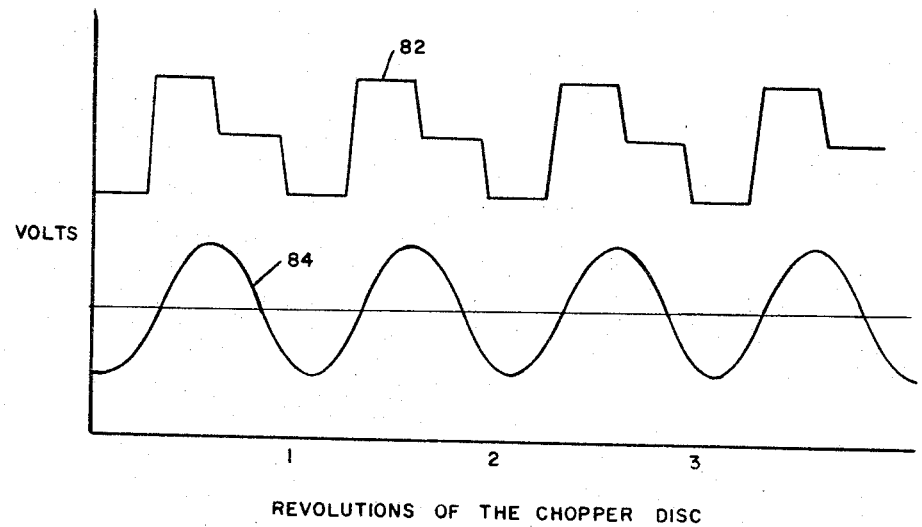
FIG. 6 is a graphic representation of the signals generated by the photosensor of FIGS. 3 and 4 before and after filtering.

As the disc 60 is driven by a motor 80 at a substantially constant rate, the photosensor 76 sequentially receives radiation corresponding to the intensity of three separate portions of a fringe pattern separated by an angle of 120° to generate the electrical signal 82 of FIGURE 6. The signal 82 can be conventionally filtered to provide a sinusoidal signal 84 of FIGURE 6 whose phase changes (with respect to the scanning rate of the disc 60) in direct relation to the movement of the fringe pattern.

Figure 4:
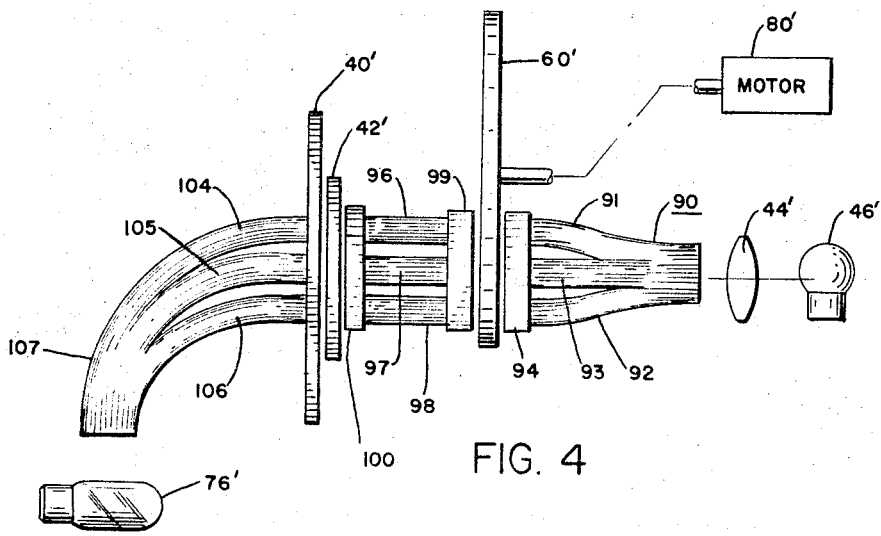
FIG. 4 is a schematic illustration of a modification of FIG. 3 by sequentially controlling the radiation applied to the gratings.

In the embodiment of FIGURE 4, the radiation applied to the gratings 40' and 42' is sequenced by a chopper disc 60'. Radiation from the source 46' is directed through a lens 44' to a common end a first furcate bundle of optical fibers 90 including three branches 91, 92, and 93. The ends of the branches 91, 92 and 93 are juxtapositioned in a straight row by a mounting frame 94 parallel to the chopper disc 60' in the same manner as the mounting frame 58 of FIGURE 3. The chopper disc 60 has three arcuate radiation transparent slots as illustrated in FIGURE 3. Three optical fiber bundles 96, 97 and 98 are mounted at one end by a mounting frame 99 in optical series with the branches 91, 92 and 93 respectively in the same manner as the mounting frame 78 of FIGURE 3. The other end of the bundles 96, 97 and 98 are positioned by a mounting frame 100 along the grating 42 at a 120° phase separation to direct radiation through the gratings 40 and 42 in optical series to the branches 104, 105 and 106 respectively of a furcate bundle of fiber optics 107. The common end of the furcate bundle 107 directs radiation towards the photosensor 76'. As the disc 60' is rotated by the motor 80', radiation sequentially is applied from various portions of the gratings to the photosensor 76' in the same manner as previously described with respect to FIGURE 3 to generate the signals of FIGURE 6.

What is claimed is:

1. A scale illumination and sensing system comprising a plurality of light valves including a common scale, a plurality of reticles each in optical series with separate portions of said scale and lens means positioned between said scale and said reticles adapted for superimposing an image of a portion of said scale and said reticles of the other, means including a single light source and a first furcate bundle of optical fibers having a plurality of branches directing light toward said plurality of light valves, a single photosensor and means including a second furcate bundle of optical fibers with a plurality of branches, each of said branches being in optical series with a light valve and with a branch of said first bundle of optical fibers directing the light from said plurality of light valves to said photosensor.

2. A scale illumination and sensing system according to claim 1 in which said scale comprises a reflective plate and the scale divisions comprise radial lines of alternate flat and concave surfaces.

3. A scale illumination and sensing system according to claim 1 in which said scale is circular and includes radial lines comprising alternate area portions of which adjacent areas have different optical characteristics.

4. An optical system comprising:
a plurality of light valves including a common scale and a plurality of reticles each in optical series with separate portions of said scale;
means including a single light source and a first furcate bundle of optical fibers having a plurality of branches directing light toward said plurality of light valves;
a single photosensor;
means including a second furcate bundle of optical fibers with a plurality of branches, each of said branches being in optical series with a light valve and with a branch of said first bundle of optical fibers directing the light from said plurality of light valves to said photosensor, and
means for periodically interrupting the radiation passing through the plurality of branches of one of said furcate bundles in a predetermined sequence.

5. An optical system as defined in claim 4 wherein:
the plurality of branches in one of said furcate bundles is arranged in a row, and
said means for periodically interrupting the radiation comprises a motor driven rotatabled disc placed adjacent said row, and having a plurality of radiation transparent passages in said disc that sequentially pass individual ones of said branches to allow passage therethrough.

6. An optical system comprising:
a single source of radiation;
a plurality of gratings mounted for generating a radiation fringe pattern;
optical means for directing radiation from said source to said plurality of gratings;
a single radiation sensitive device for generating an electrical signal in response to radiation applied thereto;
a furcate bundle of optical fibers having a common end and a plurality of branches;
means for mounting the ends of said plurality of branches along said gratings for receiving different portions of said radiation fringe pattern, and
means for mounting said common end of said furcate bundle for directing the radiation received toward said radiation sensitive means.

7. An optical system as defined in claim 6 including:
means for interrupting the radiation passing through said plurality of branches in a predetermined sequence.

8. An optical system as defined in claim 6 wherein:
said optical means includes a second furcate bundle of optical fibers having a common end positioned to receive radiation from said source and a plurality of branches, each of said branches being in optical series with a portion of said plurality of gratings and with a branch of the other furcate bundle of optical fibers.

9. An optical system as defined in claim 8 including means for interrupting the radiation passing through said plurality of branches of said second furcate bundle of optical fibers in a predetermined sequence.

References Cited

UNITED STATES PATENTS

| | | | |
|---|---|---|---|
| 2,256,595 | 9/1941 | Metcalf | 250—227 |
| 2,406,299 | 8/1946 | Koulicovitch | 250—237 |
| 2,788,519 | 4/1957 | Caldwell | 250—237 X |
| 3,096,444 | 7/1963 | Seward | 250—233 X |
| 3,116,886 | 1/1964 | Kuehue | 250—231 |
| 3,205,364 | 9/1965 | Pong | 250—231 |
| 3,227,888 | 1/1966 | Shepherd et al. | 250—237 |
| 3,240,106 | 3/1966 | Hicks | 250—227 X |
| 3,255,357 | 6/1966 | Kapany et al. | 250—227 |

RALPH G. NILSON, *Primary Examiner.*

MICHAEL LEAVITT, *Assistant Examiner.*